Oct. 31, 1939.　　　S. J. NORDSTROM　　　2,177,873
VALVE
Filed Sept. 27, 1933　　　3 Sheets-Sheet 1

INVENTOR.
Sven Johan Nordstrom.
BY
Strauch + Hoffman
ATTORNEYS

Oct. 31, 1939.   S. J. NORDSTROM   2,177,873
VALVE
Filed Sept. 27, 1933   3 Sheets-Sheet 2

INVENTOR.
Sven Johan Nordstrom.
BY Strauch + Hoffman
ATTORNEYS

Oct. 31, 1939.   S. J. NORDSTROM   2,177,873
VALVE
Filed Sept. 27, 1933    3 Sheets-Sheet 3
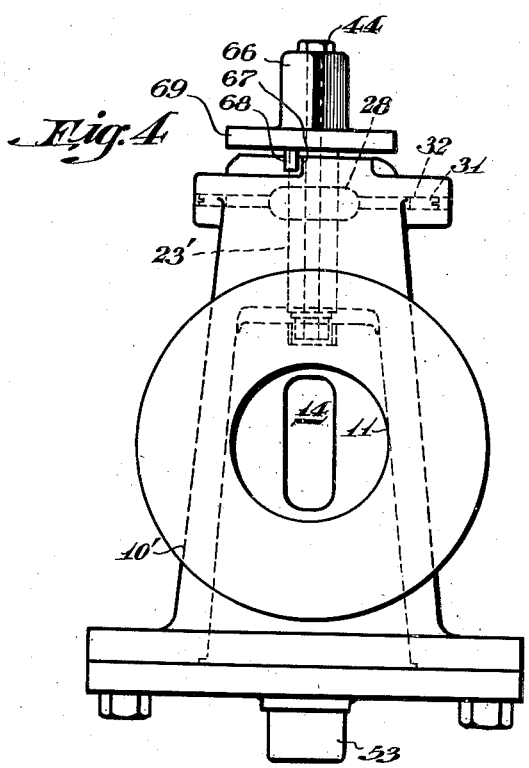
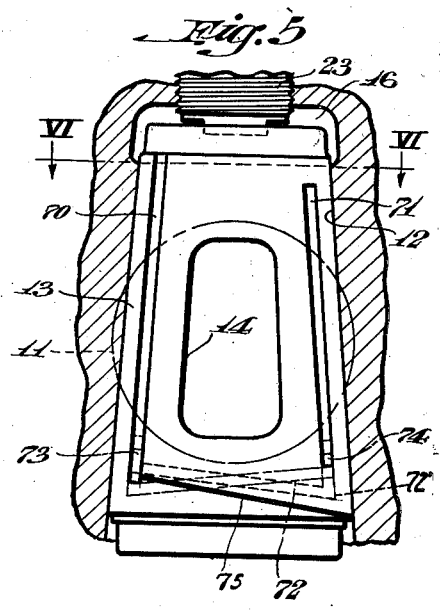
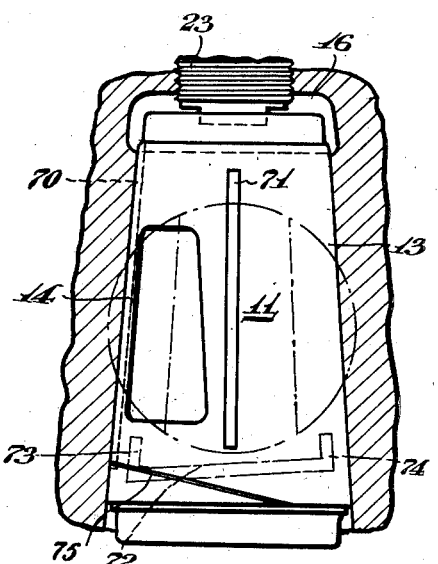
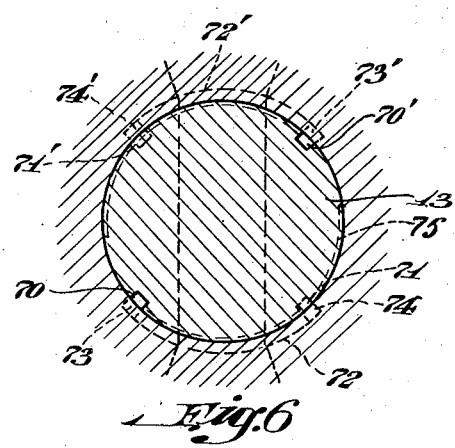
INVENTOR.
Sven Johan Nordstrom
BY
Strauch + Hoffman
ATTORNEYS Patented Oct. 31, 1939

2,177,873

UNITED STATES PATENT OFFICE 2,177,873

VALVE

Sven Johan Nordstrom, Piedmont, Calif., assignor to Merco Nordstrom Valve Company, San Francisco, Calif., a corporation of Delaware Application September 27, 1933, Serial No. 691,213

6 Claims. (Cl. 251—93)

The present invention relates to improvements in valve structures and methods of constructing the same, and is specifically directed to improvements in plug valves provided with means for preventing leakage past the operating stem, preferably in combination with means for unseating or jacking the plug to free it for rotation, but includes various sub-combinations of mechanisms useful in other types of valve structures and mechanisms. This application is a continuation in part of my copending application, Serial No. 488,253, which has since become Patent No. 1,932,322.

In plug valves in common use the operating joint between the plug operating shank or spindle and the valve body or casing is sealed by fibrous or similar packing. The use of this type of packing around the stem increases the resistance to turning offered by the plug and requires frequent adjustment to prevent leakage to the exterior from the line. In the prior pressure lubricated type of plug valve in most common use in which lubricant pressure is relied on to unseat the plug prior to rotation, the plug is resiliently urged into its seat by the fibrous or similar packing which also serves the purpose of sealing the operating joint between the plug operating shank or spindle and the valve body or casing. Thus, each time the packing is adjusted to prevent leakage past the stem the resilient pressure exerted on the plug for seating the same likewise is varied and therefore is difficult to control within the accurate limits required for trouble free service. Further, this type of packing rapidly becomes permanently compressed and loses its resiliency when exposed to the comparatively heavy seating pressures required for satisfactory sealing by the valves in high pressure service, to the alternate compression and expansion developed each time the plug is jacked and also due to wide temperature variations to which such valves are frequently subjected in operation. As a result the packing must also be frequently adjusted to control the amount of axial or unseating movement of the plug even though there may be no leakage past the stem. As valves are cared for in service by unskilled workers considerable trouble heretofore has been experienced from such valves because of the frequent adjustment and constant care and attention necessary to maintain such valves in trouble free service free from leakage and capable of being easily turned.

Because of the tendency for the plug of the tapered plug valve to become wedged in its seat, lubricant jacking means is provided for jacking the plug from its seat to release it for easy turning. In a lubricated plug valve the lubricant can act as a seal between the plug and seat only when the clearance therebetween is small enough to maintain the film of lubricant unbroken, and when the packing about the stem permits excessive separation between the plug and its seat, the line fluid passing through the valve enters between the plug and body sealing surfaces and washes away the lubricant coating or film therefrom thereby permitting scale, grit and other foreign matter to deposit on these surfaces. The presence of such substances on the seating surfaces prevents proper reseating of the plug and causes abrasion and scoring of the sealing surfaces when the plug is turned so that line leakage occurs in spite of the lubricant film on the seat, and the valve loses its effectiveness as a positive dependable shut off means. Heretofore all these disadvantages have been accepted by those skilled in the art as unavoidable.

The amount of allowable lift of the plug will depend, among other things, upon the nature of the service, the line pressure, and the viscosity of the lubricant employed. In practice, the clearance between the seating surfaces of the plug and seat when the plug is jacked preferably is limited to the order of a few thousandths of an inch, as such clearances are effectively sealed by proper distribution of lubricant of suitable viscosity between the seating surfaces of the plug and casing against line pressures as high as from five to seven thousand pounds per square inch or more.

According to the present invention, I provide a valve in which the operating stem has sealing surfaces coacting with complementary sealing surfaces on the casing, and lubricant is introduced between said sealing surfaces to prevent leakage, a secondary seal of fibrous packing material or heavy lubricant being provided about the stem to prevent or retard escape of lubricant. The lubricant seal formed between the sealing surfaces of the stem and casing is independent of the secondary sealing means, and each may be renewed independently of the other while the valve is in service. The sealing surfaces may take the form of a running thread, and the secondary seal may be located around a smooth part of the operating stem, or may surround a threaded portion thereof, lubricant being applied to the threads at their inner ends or intermediate the ends of the stem by means of a chamber suitably located.

The invention is particularly applicable to plug valves in which the plug is jacked from its seat to permit easy turning thereof, and as so applied the operating stem preferably is separate from the plug so that the secondary packing seal does not oppose or interfere with the lifting of the plug from its seat. In this construction the same chamber that applies lubricant to the sealing surfaces may be employed to jack the plug from its seat, or separate plug jacking means may be provided. Further, I provide resilient means to urge the plug into its seat which is separate from the stem sealing means, said resilient means being adjustable to provide the required seating pressure on the plug without affecting the operation of the stem sealing means, and the resilient plug seating means preferably is constructed to limit the lift of the plug within the limits required for practical operation.

The lubricant system employed for sealing and lubricating the plug involves an arrangement of grooving in the seating surface of the plug and seat which provides a substantially complete lubricant seal in closed position of the valve, the longitudinal grooves exposed to line fluid in turning the valve to open position being located in the plug and being disconnected from the source of lubricant pressure upon turning of the valve. These grooves may be connected with a lubricant chamber located at the smaller end of the plug which serves to supply lubricant to the threads of the operating stem, if desired. Also, the lubricant may be conducted to the space or chamber formed over the large end of the plug at a lag or loss in pressure to prevent trapping of pressure therein which would interfere with proper jacking of the plug from its seat.

In a preferred specific embodiment of my invention I provide a tapered plug valve in which an operating stem separate from the plug is threaded through the casing and lubricant under pressure is applied to the threads from a lubricant chamber located adjacent the end of the stem to provide a seal against leakage, a secondary seal of packing material or heavy lubricant being applied around an outer portion of the threaded stem to retard or prevent outward escape of lubricant. The lubricant chamber thus provided serves the purpose of lubricating and sealing the threads, jacking the tapered plug from its seat, and supplies lubricant to the lubricant grooves formed in the seating surface of the plug and casing. The arrangement of lubricant grooves is such that the longitudinal grooves are located in the plug and the circumferential grooves may be located in the plug or casing, connection being established with the lubricant chamber at the end of the plug in any suitable manner. The plug is urged into its seat by an inherently resilient cover and the seating pressure of the cover is transmitted to the plug through a ball thrust bearing which centers the seating pressure and reduces frictional resistance to turning of the plug. The seating pressure can be easily adjusted by means of an adjusting screw on one side of a sealing diaphragm clamped between the cover and casing.

The metal cover is strong enough to withstand the internal pressures developed in the valve and is constructed of cast steel or steel forging which has the required elasticity and inherent resilience to enable development of sufficient initial stress to seat the plug and which will not be stressed or deflected beyond its elastic limit when the plug is lifted from its seat. The cover likewise limits the unseating movement of the plug to an amount insufficient to break the seal established by the lubricant between the sealing surfaces of the valve. This construction provides a simple plug valve structure suitable for low pressure or high pressure service, having long life, which is easy to operate, and in which an effective lubricant seal is maintained against leakage of line fluid.

Accordingly, it is an object of the present invention to provide a valve having an operating stem with a sealing surface thereon cooperating with a correspondingly shaped sealing surface on the valve casing with means for applying lubricant under pressure to the sealing surfaces, and a secondary packing to prevent leakage therethrough to the exterior.

Another object of the invention is the provision of a plug valve having an operating stem with sealing surfaces thereon cooperating with sealing surfaces on the valve casing, lubricant under pressure being introduced therebetween, and a secondary packing seal to prevent leakage, in combination with means for resiliently holding the plug on its seat.

Another object of the invention is the provision of a plug valve having an operating stem with a sealing surface thereon cooperating with a sealing surface on the valve casing, lubricant under pressure being introduced therebetween for lubrication, to prevent leakage, and for jacking the plug from its seat, the plug being held resiliently on its seat, and a secondary packing seal being provided to prevent leakage of lubricant between said sealing surfaces.

A further object of this invention is the provision of a plug valve having an operating stem with a sealing surface thereon cooperating with a correspondingly shaped sealing surface on the valve casing, means being provided for introducing viscous lubricant under pressure to the sealing surfaces to prevent leakage therethrough to the exterior, and for lubricating the valve plug seating surfaces, a secondary packing being provided to prevent leakage of lubricant around the stem.

Another object of the present invention is the provision of a plug valve having an operating stem for the valve with a sealing surface cooperating with a correspondingly shaped sealing surface on the valve casing, and having means for introducing viscous lubricant under pressure between the sealing surfaces to prevent leakage therethrough, the plug being resiliently and adjustably held on its seat.

A further object is the provision of a plug valve in which the valve stem may be repacked while the valve is operating on high pressure service without taking the valve out of service.

A further object of this invention is the provision of a system of lubricant grooves in the seating surfaces of the plug and casing which provides a substantially closed circuit lubricating system at each end of the port in closed position, and which disconnects the exposed grooves of the system in going between open and closed positions.

Still a further object of the invention is the provision in a plug valve, of an operating stem separate from the plug member with means for sealing the stem against leakage, and a resilient cover adjustably bearing on the plug through an anti-friction thrust bearing.

Among other objects of my invention is the provision of a valve in the larger sizes which combines great seating and sealing forces in a compact structure having few parts, and is easy to operate. These and other objects will be apparent from a consideration of the annexed drawings taken in connection with the description and in which:

Figure 4 is a view in elevation of a modification adapted to be operated by a wrench.

Figure 5 is a partly schematic view of a modification showing a modified lubricant system for the plug.

Figure 6 is a section on line VI—VI of Figure 5.

Figure 7 is a partly schematic view of the modification shown in Figure 5, the plug being turned to half open position.

Figure 1:
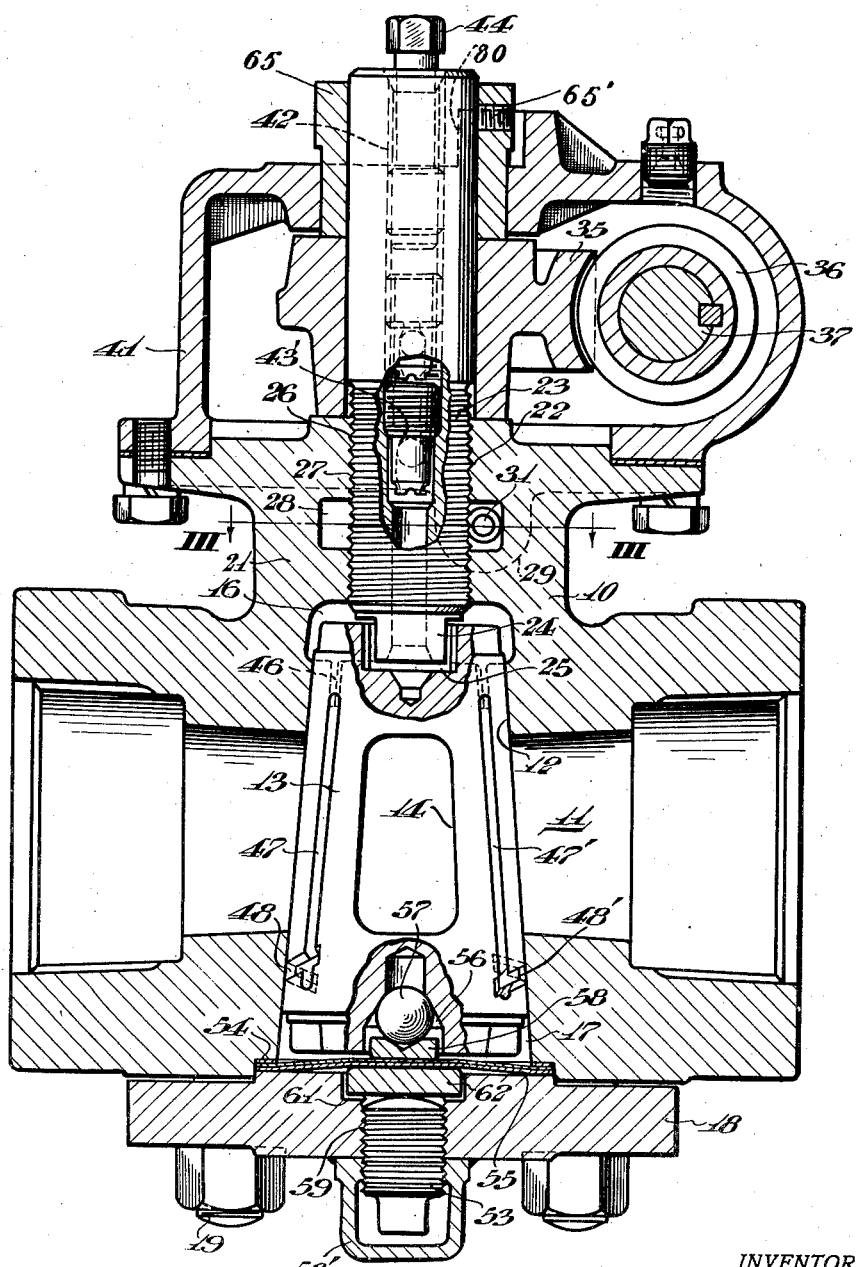
Figure 1 is a view in section of a valve built according to one modification of the invention, the plug being shown in elevation.
Figure 2:
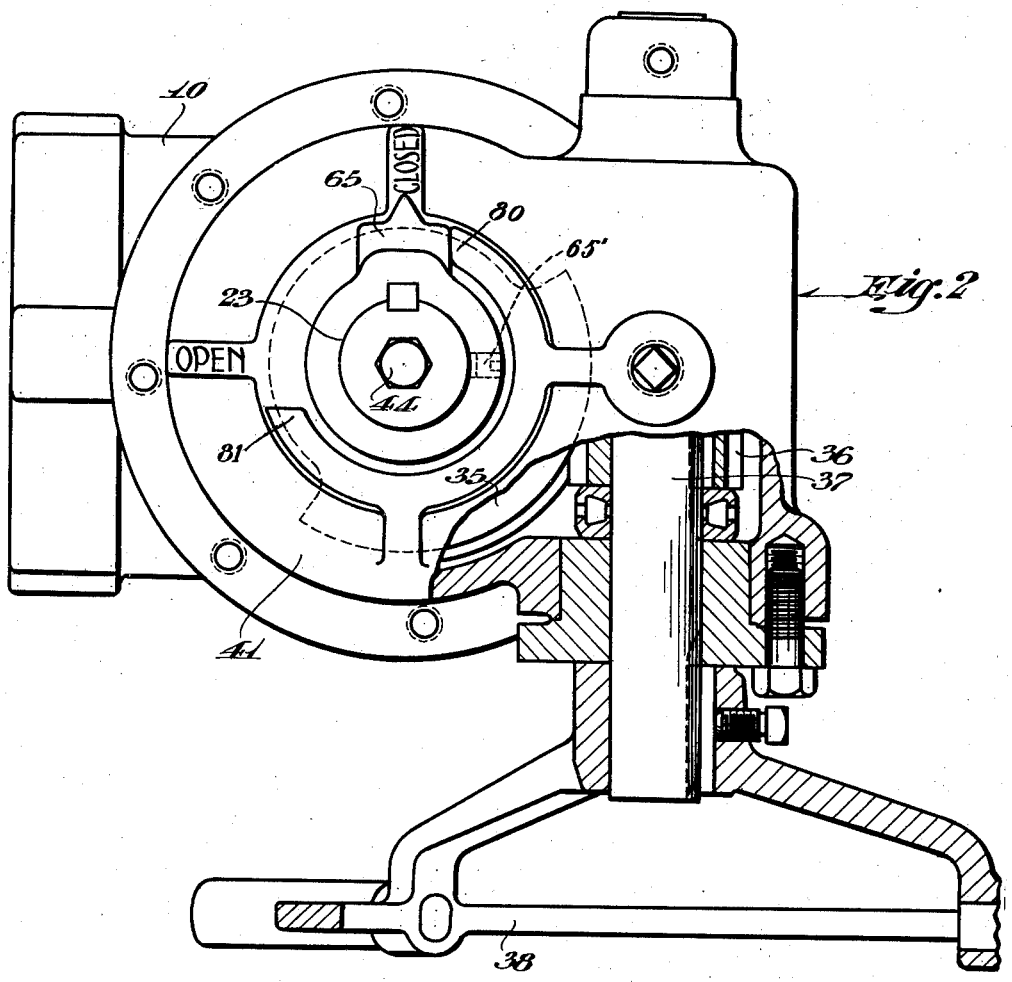
Figure 2 is a plan view partly in section of the modification shown in Figure 1.
Figure 3:
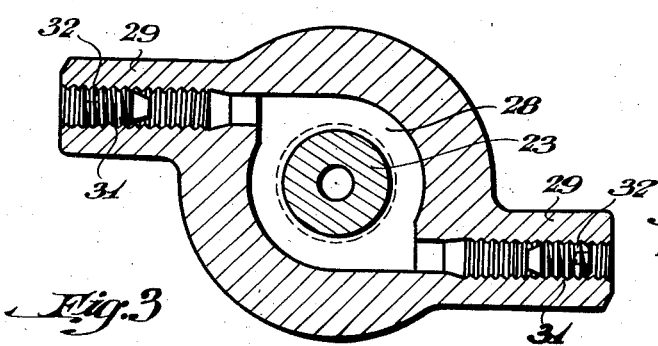
Figure 3 is a section on line III—III of Figure 1.

Referring to the drawings Figure 1, the invention comprises a body or casing 10 provided with a passageway 11 for flow of line fluid therethrough. Also formed within the casing and extending transversely of the passageway 11, is a bore 12 which forms a tapered or conical seat. Disposed within seat 12 there is a conical plug 13 provided with a hole or port 14 therethrough adapted to register with passageway 11 in open position of the valve. A lubricant chamber 16 is provided at the small end of the plug, and at the large end of the plug is formed a chamber 17 defined between the casing walls and cover plate 18 held in place at its margin by studs 19.

The casing 10 has an extension 21 at the small end of the plug through which a hole 22 extends, and an operating stem 23 extends through said hole and into the chamber 16 at the small end of the plug. The operating stem 23 is separate from the plug 13, and has a tongue or extension 24 fitted into a suitable recess 25 in the small end of the plug, the fit being loose enough to provide for a slight play or lost motion. The stem 23 has an accurately machined running thread as indicated at 26, the threads cooperating with similar threads 27 in the wall of hole 22 in the extension 21 of the casing. Because of the accurate machining a very close fit between the threads 26 and 27 is provided. A recess 28 is formed in the extension 21 surrounding the hole 22 which is adapted to be packed with a suitable lubricant or fibrous packing material to provide a secondary seal for the stem of the valve. One or more extensions 29 are provided on the exterior of extension 21, and tapped holes 31 are drilled therethrough, which preferably are tangential to the stem 23 The recess 28 may be filled with packing through holes 31, and the pressure of the packing in this recess can be adjusted by the threaded pistons 32 cooperating with said holes 31. A kerf is provided in the end of the pistons to permit turning thereof by a suitable wrench. As recess 28 is spaced from chamber 16 the packing therein may be removed without taking the valve out of service.

The plug 13 is adapted to be rotated in its seat to open or closed position by the segmental worm gear 35 suitably secured to the operating stem 23, and cooperating worm 36 secured on shaft 37, the latter shaft being rotatable by a hand wheel 38 secured thereto or by other suitable means.

The extension 21 of the casing has a flange thereon to which is secured a casing 41 through a leak proof connection as shown for housing the gearing machanism for operating the plug.

For supplying lubricant to the seating surfaces of the plug and casing and for jacking the plug from its seat, the stem 23 which extends externally of the casing 41 has a hole 42 drilled therethrough in which is located a screw 44 for developing lubricant pressure. Suitable ball check valve fittings 43' in the hole 42 prevent escape of lubricant or line fluid when the screw is removed for refilling. The hole 42 extends the whole way through the stem so as to provide communication through recess 25 with the lubricant chamber 16 at the small end of the plug. The seat 12 has short connecting grooves 46 communicating with the chamber 16 and with two pairs of vertical lubricant grooves 47, 47' in the surface of the plug. The grooves 47 are disposed on the plug so that in the open or closed position thereof they communicate with the connecting grooves 46, and they communicate at the large end of the plug in all positions with the ends of the circumferential groove 48 in the plug. The grooves 47' likewise communicate with the connecting grooves 46 in the open or closed position, and with the ends of circumferential groove 48' at the large end of the plug diametrically opposite groove 48. The ends of grooves 48 and 48' are spaced substantially 90° apart. For jacking the plug from its seat by lubricant pressure, the screw 44 is advanced into the stem thereby introducing lubricant into the chamber 16 and grooves 47, 48 and 47', 43' to lift the plug from its seat and lubricate the seating surfaces.

The cover 18 is inherently resilient and to secure sufficient strength and resiliency in the cover it is formed preferably as a steel forging or a steel casting of suitable thickness. A gasket 54 of aluminum or other suitable material is located on a suitable shoulder surrounding the seat 12 at the large end of the plug, and a diaphragm 55 is located on this washer and is clamped between the gasket and the cover 18. The diaphragm 55 may be single, but preferably is composed of two discs, the internal disc being preferably a noncorrosive alloy such as 18—8 stainless steel, the other or external diaphragm being composed of carbon steel having the proper physical characteristics. The plug has a recess 56 in its large end in which is located a steel ball 57, and a thrust disc 58 having a suitable recess therein is located between the ball 57 and diaphragm 55. The cover 18 has a threaded bore 59 therein adapted to receive the adjusting screw 53, this bore being counterbored to provide a shoulder 61 at its interior. A steel thrust disc 62 is located in this counterbore, and is adapted to be pressed against the diaphragm 55 by the adjustment screw 53. The adjustment screw 53 may be covered by a combined lock nut and cap 53' which preferably is spot welded to the cover to prevent access to screw 53. When it becomes necessary to adjust the screw 53 this cap can be broken loose from the weld by a pipe wrench.

From the descriptions so far it will be apparent that the valve plug 13 is adapted to be pressed resiliently into its seat by the resilient cover 18, and the force exerted by the cover can be regulated by adjustment of the screw 53. Preferably this adjustment is maintained so that the valve plug can be lifted sufficiently by lubricant pressure to permit easy turning but insufficient to break the lubricant seal on the seating surfaces. The screw 53 bears against the thrust disc 62 which presses through the diaphragm against the thrust disc 58 and ball 57 and thereby forces the valve plug into its seat. Adjustment of the screw 53 inward increases the pressure exerted by the cover, while adjustment outward decreases the pressure. It is not possible for lubricant or line fluid to leak to the outside of the casing at this end because the aluminum gasket 54 and diaphragm 55 effectively seal the large end of the valve seat.

As heretofore described, the valve is adapted to be operated by rotation of the operating wheel 38 which rotates worm 36 coacting with segmental worm gear 35 keyed to the stem 23. As the fit between the threads 26 and 27 on the stem is very close a considerable initial resistance against turning the stem may be encountered. The fit between the tongue 24 on the stem and recess 25 in the plug provides for the necessary manufacturing tolerances, and additional clearance for lost motion may be provided in order that the resistance to initially turn the stem 23 can be overcome before the resistance of valve plug 13 to turning is encountered. Also as rotation of stem 23 advances the stem into the recess 16 in turning the valve from open to closed position, the play between the extension 24 and recess 25 permits a slight building up of pressure in the chamber 16 to jack the plug from its seat before a turning torque is applied to the plug. The lubricant thus forced into the grooves 47 and 47' is smeared over the seating surface when the plug is turned, and being introduced between the threaded sealing surfaces of the stem and casing acts as a seal to prevent leakage therebetween. The packing in chamber 28, which may be a highly viscous sealing medium, cooperating with the threads 26 on the stem provides an absolute seal against leakage of valve lubricant or line fluid through the interior of the valve. The completeness of this seal can be adjusted by proper adjustment of the threaded pistons 32 to exert the desired pressure on the packing therein, sufficient pressure preferably being applied to conform the packing around the threaded stem as a prolongation of the adjacent threaded portions of the casing. An indicator element 65 is secured to the outer end of the valve stem 23 and has an index thereon which indicates the open and closed positions of the valve plug, and the direction of flow of fluid through the passage 11. Element 65 is secured to the outer end of the valve stem 23 preferably by a set screw indicated at 65' to permit adjustment thereof. It is to be understood that element 65 is spaced slightly from the portion of segmental worm gear 35 contacting stem 23 in order that element 65 may not be jammed against the worm gear when stem 23 is rotated in a direction as to cause its downward movement. Suitable stops to determine the degree of rotation of the valves are preferably provided in connection with indicator element 65 as shown at 80 and 81.

Figure 4 shows a modification adapted for operation with a wrench. This construction is like that shown in Figure 1 and the stem 23', corresponding to stem 23, has a squared portion 66 at its outer end for receiving an operating wrench. A suitable stop 67 is provided on the body 10' of the valve which cooperates with a stop 68 on the collar 69 suitably secured to the stem 23' to limit the rotation of the stem.

In the modification shown in Figures 4 to 7 the lubricating system for the plug is modified to provide a substantially complete sealing around the ports therein. In this modification there are two diametrically opposite lubricant grooves 70 and 70' extending longitudinally in the surface of the plug and communicating with the lubricant chamber 16 at the small end thereof. The two diametrically opposite shorter lubricant grooves 71, 71' do not communicate with the lubricant chamber 16. Spiral grooves 72 and 72' are disposed in the casing below the passage 11 at the large end of the seat, these grooves communicating respectively with grooves 70, 71 and 70' and 71'. Short vertical grooves 73, 74 extend upward from the ends of spiral groove 72, and similar grooves 73', 74' extend from the ends of groove 72'.

In the open position of the plug the groove 70 communicates with the chamber 16 at one end, and at its other end overlaps the end groove 73 of the spiral groove 72. The shorter groove 71 likewise communicates with the end of short groove 74 connected to spiral groove 72. On the other side of the plug the long groove 70' likewise communicates with chamber 16 at one end and at its other end overlaps the short groove 73' connected to the end of spiral groove 72'. The short groove 71' does not communicate with chamber 16 but overlaps short groove 74' which connects with the other end of spiral groove 72'. Therefore, at each end of the port 14 through the plug a substantial seal is formed. At one end this seal comprises chamber 16, and grooves 70, 73, 72, 74 and 71 and at the other end comprises chamber 16, and grooves 70', 73', 72', 74' and 71'. In turning the plug from open to closed position the motion of the plug disconnects the grooves 70 and 71 from the short grooves 73 and 74 communicating with spiral groove 72 so as to provide a lubricant cut-off from the source of lubricant pressure in chamber 16 for vertical groove 71. This prevents extrusion of lubricant into the passage 11 through the valve when groove 71 is exposed thereto. Lubricant groove 71' is similarly cut off from its source of lubricant supply for it becomes disconnected from short groove 74'.

Figure 7 shows the plug valve in partially closed position, with only one set of grooves shown. It will be seen that groove 71 is entirely disconnected from chamber 16 and groove 72, while groove 70 is still connected to chamber 16 but is not connected to groove 72. In the full closed position, groove 70' will move around until it overlaps short groove 74, and groove 71 will overlap short groove 73. At the same time, groove 70 is brought to overlap short groove 74' while groove 71' overlaps short groove 73'. In closed position, therefore, the passageway is substantially sealed at one end by chamber 16 and grooves 70, 74', 72', 73' and 71', and at the other end by chamber 16 and grooves 70', 74, 72, 73 and 71. From the foregoing it will be seen that the port 14 in the plug is substantially surrounded at each end by a system of lubricant grooves in the full open and full closed positions, and in an intermediate position the grooves exposed to line fluid are cut off from the source of lubricant pressure.

Occasionally, due to various causes, lubricant or line fluid, or both, may become trapped in chamber 17 (Figure 1), and the accumulation of pressure therein acting on the larger end of the plug wedges the plug into its seat. Under such conditions the application of lubricant pressure to the chamber 16 and grooves 47, 47' etc., cannot lift the plug to release it from its seat because the lubricant and fluid accumulated in chamber 16 is incompressible. To obviate this difficulty an attenuated groove 75 (Figures 5, 6 and 7) is cut into the plug, this groove extending spirally about the plug for about 180°, and having one end communicating with the chamber 17. The other end of the groove 75 communicates with the groove 70 in all positions of the plug. When the valve plug is in sealing position in either open or closed relation to passageway 11, groove 75 serves to establish an equilibrium as to pressure between chambers 16 and 17. When it is desired to jack the plug, the pressure applied to chamber 16 is not communicated to chamber 17 sufficiently fast to create an opposing pressure in chamber 17 in sufficient time to oppose the jacking pressure. Because of the small size of this groove there is a lag in pressure between the chamber 16 and chamber 17, so that the groove does not interfere with jacking of the plug, and any accumulation of lubricant or line fluid in chamber 17 can escape therefrom when the plug is jacked, thus avoiding binding of the plug.

The valves constructed according to the present invention provide a positive seal against leakage of line fluid past the plug or past the operating stem, and the lubricating and sealing system is such that even in the larger sizes no gearing or other mechanism is necessary to enable free turning of the valve. The sinuous and irregular joint formed between the operating stem and valve casing which is sealed against leakage by viscous lubricant offers little resistance to turning, and by providing a lost motion between the stem and plug the high original turning resistances are gradually encountered. Concerning the lubricants employed, it is desired to point out that separate seals as herein provided in combination with lubricants of different viscosity are highly desirable, since it has been found that the same lubricant cannot satisfactorily be employed for both sealing the valve stem and accomplishing jacking of the valve plug. Experiments show that a packing of much higher viscosity is desirable around the valve operating stem. While this packing is a thoroughly plastic material, it is nevertheless viscous to a degree so as to be incapable of use for lubricating the seating surfaces of the valves by means of the lubricant groove system. Moreover, in the present invention the arrangement of separate seals is such that either sealing medium may be renewed independently of the other without removing the valve from service. The resilient cover provides a strong and accurate resilient seating force which can be properly adjusted and provides a compact structure of particular importance in making high pressure valves.

The invention may be embodied in other specific forms without department from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a plug valve, a casing having a passageway therethrough and a tapered valve seat formed transversely thereof, a tapered plug seated therein and having a port therethrough adapted to register with the passageway, said plug and casing forming a lubricant chamber adjacent the smaller end of the plug, non-connected helical grooves formed in the seating surface, pairs of longitudinal grooves in the seating surface on opposite ends of the passageway, said pairs each connecting at one end with the ends of the corresponding helical groove, and dwarf connecting grooves connecting the opposite ends of the longitudinal grooves with said lubricant chamber in certain positions of the plug, means for resiliently holding the plug in its seat, means for introducing lubricant under pressure to said lubricant chamber, and means for operating said plug.

2. In a plug valve, a casing having a passageway therethrough and a tapered valve seat formed transversely thereof, a tapered plug seated therein and having a port therethrough adapted to register with the passageway, said plug and casing forming a lubricant chamber at its smaller end, non-connected helical grooves formed in the valve seat adjacent the passageway at the large end of the plug, pairs of longitudinal grooves in the plug surface at opposite ends of the port, said pairs each connecting at one end with the ends of the corresponding helical groove, only one longitudinal groove of each pair connecting with said lubricant chamber whereby the port is substantially surrounded by lubricant ducts in certain positions of the plug, and means for operating said plug.

3. In a plug valve, a casing having a passageway therethrough and a tapered valve seat formed transversely thereof, a tapered plug seated therein and having a port therethrough adapted to register with the passageway, said plug and casing forming a circumferential lubricant chamber at its smaller end, non-connected helical grooves formed in the valve seat adjacent the passageway at the larger end of the plug, pairs of longitudinal grooves in the seating surface of the plug and casing at opposite ends of the port, at least one groove of each pair connecting at one end with the corresponding end of the corresponding helical groove, whereby the port is substantially surrounded by lubricant ducts in certain positions of the plug, and means for operating the plug.

4. In a plug valve, a casing having a passageway therethrough and a tapered valve seat formed transversely thereof, a tapered plug seated therein and having a port therethrough adapted to register with the passageway, non-connected helical grooves formed in the seating surfaces of the plug and seat adjacent the passageway at one end of the plug, pairs of longitudinal grooves in the seating surfaces of the plug and seat at opposite ends of the port, at least one groove of each pair connecting at one end with the corresponding end of the corresponding helical groove, whereby the port is substantially surrounded by lubricant ducts in certain positions of the plug, and means for rotating said plug.

5. In a plug valve, a casing having a passageway therethrough and a tapered valve seat formed transversely thereof, a tapered plug seated therein and having a port therethrough adapted to register with the passageway, a circumferential chamber formed in the casing at the smaller end of said plug, nonconnected circumferential grooves formed in the seating surface of the plug and casing adjacent the passageway at the larger end of the plug, pairs of longitudinal grooves in the plug surface at opposite sides of the port, at least one groove of each pair connecting at one end with a corresponding end of the corresponding circumferential groove, and at least one groove of each pair being connected in certain positions of the plug with said circumferential lubricant chamber.

6. In a plug valve, a casing having a passageway therethrough and a tapered valve seat formed transversely thereof, a tapered plug seated therein and having a port therethrough adapted to register with the passageway, a circumferential lubricant chamber formed in the casing adjacent the smaller end of the plug, nonconnected circumferential grooves formed in the valve seat adjacent the passageway at the larger end of the plug, pairs of longitudinal grooves in the plug surface at opposite ends of the port adapted to connect with said circumferential grooves in certain positions of the plug, and at least one longitudinal groove of each pair being connected at one end with said circumferential lubricant chamber.

SVEN JOHAN NORDSTROM.